United States Patent [19]

Diekötter et al.

[11] Patent Number: 4,545,969

[45] Date of Patent: Oct. 8, 1985

[54] PROCESS FOR DEWATERING ZEOLITE SUSPENSIONS

[75] Inventors: Friedrich W. Diekötter, Langenfeld; Edgar Hönges; Günther Just, both of Hilden, all of Fed. Rep. of Germany; Heinz-Gerd Smolka, Johannesburg, South Africa; Willi Wüst, Ratingen, Fed. Rep. of Germany

[73] Assignee: Henkel KGaA, Duesseldorf, Fed. Rep. of Germany

[21] Appl. No.: 528,293

[22] Filed: Aug. 31, 1983

[30] Foreign Application Priority Data

Sep. 8, 1982 [DE] Fed. Rep. of Germany ....... 3233289

[51] Int. Cl.$^4$ .................. C01B 33/28; B01D 33/00
[52] U.S. Cl. .................. 423/328; 210/384; 210/400; 210/783
[58] Field of Search ............. 423/329, 328; 210/383, 210/384, 400, 783; 23/293

[56] References Cited

U.S. PATENT DOCUMENTS

| 2,374,114 | 4/1945 | McBerty | 210/384 |
| 2,377,189 | 5/1945 | Stanley | 210/384 |
| 4,041,135 | 8/1977 | Williams et al. | 423/328 |
| 4,123,360 | 10/1978 | Havalda | 210/383 |
| 4,166,034 | 8/1979 | Bodine | 210/748 |

FOREIGN PATENT DOCUMENTS

| 0058908 | 9/1982 | European Pat. Off. | 210/384 |
| 111759 | 9/1944 | Sweden | 210/384 |
| 481037 | 3/1938 | United Kingdom | 210/384 |

*Primary Examiner*—Edward J. Meros
*Attorney, Agent, or Firm*—Ernest G. Szoke; Henry E. Millson, Jr.; Mark A. Greenfield

[57] ABSTRACT

In the treatment of a zeolite suspension to separate solids from the mother and/or washing liquor, a vibrator is used in the suction drying zone of a vacuum filter in order to partially liquefy the filter cake material through the introduction of shear forces into the solidified filter cake, so that further separation of the pure liquid phase can take place in the suction drying zone of the vacuum filter.

9 Claims, 1 Drawing Figure

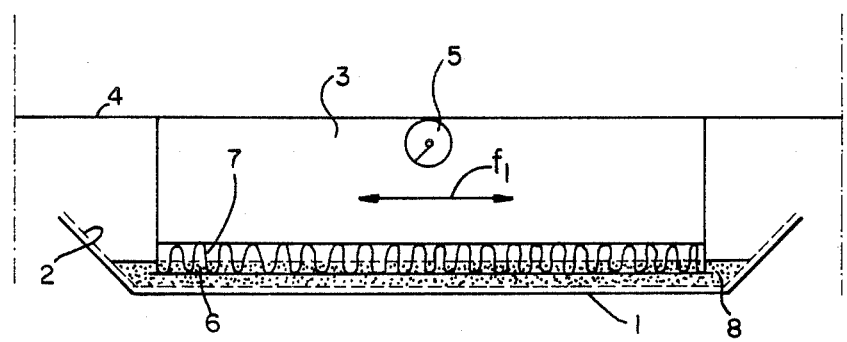

PROCESS FOR DEWATERING ZEOLITE SUSPENSIONS

This invention relates to a process and an apparatus for treating a zeolite suspension to separate solids from the mother and/or washing liquor in the production of zeolites. The apparatus includes a vacuum filter which contains a circulating filter cloth having a horizontally extending suction drying zone.

BACKGROUND OF THE INVENTION

In the production of zeolites, particularly type 4A zeolite, the zeolite suspension resulting from known process steps is subjected to a treatment to separate solids from the washing and/or mother liquor in order to minimize costs, particularly energy costs, in the subsequent drying process.

In the process described in U.S. Pat. No. 4,041,135 and corresponding German Application No. 26 33 304, the zeolite suspension in the form of an aqueous mass is delivered through a pipe to a solids separation zone consisting of a circulating, porous belt. A controlled vacuum is applied at different points of the belt by means of a suitable vacuum source; the zeolite suspension being delivered onto the belt at a controlled speed by a distributor. The mother liquor and additionally supplied washing liquor are removed under suction from the zeolite suspension by means of suction boxes which are mounted to reciprocate below the porous filter belt in the direction of movement thereof, the arrangement being such that, in the event of a forward movement both of the filter belt and of the suction boxes, the suction boxes are connected to a vacuum source, whereas during the return movement of the suction boxes in the opposite direction to the filter belt, the suction boxes are ventilated. The removal under suction of the mother and washing liquors results in the formation on the filter belt of a partly dewatered filter cake which, at the ejection end of the filter belt, is removed therefrom and subsequently dried, preferably by spray drying. The dried product is in the form of a friable mass which can readily be reduced to a fine powder.

The filter cake obtained by means of the described vacuum belt filter contains approximately 50% of water with small amounts of mother or washing liquor. The drying of the filter cake leaving the vacuum belt filter with a liquid content of about 50% involves a high consumption of energy, for example, fuel gas in the case of spray drying.

SUMMARY OF THE INVENTION

The present invention increases the concentration of solids in a zeolite filter cake to a level greater than that heretofore present in the vacuum filter, in order to reduce energy consumption during drying of the filter cake.

To achieve this, the invention introduces shear forces into the filter cake by means of at least one vibrator arranged above the filter cloth in the suction drying zone of the vacuum filter.

By virtue of the particular rheological properties of zeolites, particularly type 4A zeolite, the introduction of shear forces into the almost completely solidified filter cake results in a partial, reversible liquefaction of the filter cake material so that the vacuum filter is capable of carrying out another partial separation of the liquid phase. Accordingly, after the partial liquefaction brought about by the introduction of shear forces, the filtration process can be continued, and part of the homogeneous liquid phase separates off while the zeolite crystals remain behind. A more tightly packed filter cake containing more zeolite is obtained in this manner.

Where a vibrator is used, it is possible to obtain an increase in concentration of around 2%. A further increase in concentration can be obtained by the use of additional vibrators.

Accordingly, an advantage of the invention lies in the fact that less energy is consumed during the subsequent drying of the zeolite material. An increase in concentration of the filter cake and hence a reduction in its percentage liquid content results in the need for less evaporation of water during drying, so that considerable savings of energy are obtained.

In one advantageous embodiment of the invention, the vibrator comprises a baffle plate which is arranged a short distance above the filter cloth, but positioned to penetrate into the filter cake, and which is designed to be horizontally oscillated perpendicularly to the direction of movement of the filter cloth. The baffle plate is preferably fixed to a comb-like strip arranged on the lower edge of a vertically suspended, spring-mounted frame to which a vibration generating unit is attached. Vibration generating units of this kind for producing an oscillating reciprocating movement are known and consist, for example, of two unbalanced motors which are associated with one another in such a way that reciprocating vibrations active in one direction only are imparted while lateral vibrations are suppressed by interference.

The process according to the invention for treating a zeolite suspension to separate solids from the mother or washing liquor using a vacuum filter comprises a circulating filter cloth with a horizontally extending suction drying zone wherein shear forces are introduced into the zeolite filter cake in the suction drying zone.

The size of the vibrator depends upon the dimensions of the filter. For a typical application, the length of the baffle plate which penetrates into the filter cake is 2.8 meters, the amplitude of the resulting vibration is approximately 7 mm, the frequency is 25 Hz, and the power consumption is 0.4 kw.

BRIEF DESCRIPTION OF THE DRAWING

The apparatus according to the invention is described in more detail in the following description which refers to the diagrammatic drawing (FIGURE) which shows by way of example a Pannevis filter which contains suction boxes which are designed to move back and forth within the suction zones in the direction of movement of the filter cloth.

DETAILED DESCRIPTION OF THE INVENTION

The drawing shows in part the operation of a known vacuum belt filter with filter tank 1 for supporting the upper part of a porous filter cloth 2 which is designed to be continuously circulated perpendicularly to the plane of the drawing. Filter tank 1 is provided with outlets (not shown) to enable liquid to be drawn off under suction during the vacuum phase of the filter.

After the vacuum phase, the filter tank is ventilated and, during the return phase, is returned to a starting position in a direction opposite to the direction of movement of the filter cloth, after which another vacuum phase begins, and so on. Above filter cloth 2, a frame 3 is spring-mounted by means of mounting strip 4 in such a way that only minor dynamic forces are transmitted, for example, to a bearing housing (not shown). For further isolation, the bearing housing can be connected by damped spring elements to frame 3.

A vibration generating unit 5 is attached to frame 3, and contains, for example, two unbalanced motors (not shown) associated with one another in such a way that frame 3, which is positioned perpendicularly to the direction of movement of the filter cloth 2, is vibrated horizontally in the direction of the arrow $f_1$. A baffle plate 6 is fixed by means of a comb-like strip 7 to the lower edge of frame 3, being situated a short distance above filter cloth 2 and penetrating into filter cake 8 as it is formed on filter cloth 2.

The vibrator consisting of the elements 3, 4, 5, 6 and 7 is arranged above filter cloth 2 in the suction drying zone of the vacuum filter in which an already dewatered and hence virtually solid filter cake 8 is present. When the vibration generating unit 5 is in operation, shear forces are introduced into filter cake 8, resulting in liquefaction or partial liquefaction of filter cake 8 by virtue of the particular rheological properties of the zeolite material. This provides for further separation of the pure liquid phase by the vacuum filter because, according to the intion, the vibrator is arranged within the effective range of an active suction zone preceding the ejection end of filter cloth 2. One or more additional vibrators (not shown) can be positioned in the direction of movement of filter cloth 2 in order to reintroduce shear forces into filter cake 8 at places where filter cake 8 has undergone re-solidification.

What is claimed is:

1. In a process for dewatering a zeolite suspension by introducing said suspension to the top surface of a horizontally circulating filter cloth and applying vacuum filtration to remove water from said suspension by means of a horizontally extending suction drying zone positioned under said filter cloth so as to form a partially dried zeolite filter cake, the improvement comprising:

removing additional water by introducing vibratory shearing forces into said partially dried zeolite filter cake, at a vibratory amplitude sufficient to cause at least partial reversible liquefaction thereof, by means of at least one vibrator positioned within said suction drying zone above said filter cake and having an operatively connected horizontally vibratory baffle plate extending downward into said partially dried zeolite filter cake and oscillating perpendicularly to the direction of movement of said filter cloth, while continuing the application of said vacuum filtration.

2. The process of claim 1 wherein said baffle plate is attached to a comb-like strip fastened to the lower portion of a vertically suspended spring-mounted frame which is in turn attached to said vibrator.

3. The process of claim 2 wherein said vibrator comprises two unbalanced motors arranged to produce horizontal vibrations.

4. The process of claim 1 wherein after said liquefaction has reversed and said filter cake has re-solidified, still additional water is removed from said partially dried filter cake by repeating the introduction of vibratory shearing forces in the same manner and using essentially similar means, while said filter cake is still within said extending suction drying zone.

5. The process of claim 3 wherein after said liquefaction has reversed and said filter cake has re-solidified, still additional water is removed from said partially dried filter cake by repeating the introduction of vibratory shearing forces in the same manner and using essentially similar means, while said filter cake is still within said extending suction drying zone.

6. The process of claim 1 wherein said zeolite is type 4A.

7. The process of claim 3 wherein said zeolite is type 4A.

8. The process of claim 4 wherein said zeolite is type 4A.

9. The process of claim 5 wherein said zeolite is type 4A.

* * * * *